United States Patent
Jung et al.

(10) Patent No.: US 10,932,435 B2
(45) Date of Patent: Mar. 2, 2021

(54) PET TRAVEL SYSTEMS AND METHODS ON A VEHICLE

(71) Applicant: THE BOEING COMPANY, Chicago, IL (US)

(72) Inventors: Sun Min Jung, Seattle, WA (US); Amar Seta, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 749 days.

(21) Appl. No.: 15/627,505

(22) Filed: Jun. 20, 2017

(65) Prior Publication Data

US 2018/0359985 A1    Dec. 20, 2018

(51) Int. Cl.
*A01K 1/00*  (2006.01)
*A01K 29/00*  (2006.01)
(Continued)

(52) U.S. Cl.
CPC .......... *A01K 1/0035* (2013.01); *A01K 1/0052* (2013.01); *A01K 1/0064* (2013.01);
(Continued)

(58) Field of Classification Search
CPC .. A01K 1/0035; A01K 1/0047; A01K 1/0052; A01K 1/0064; A01K 1/015; A01K 1/0157; A01K 1/02; A01K 1/0236; A01K 1/0245; A01K 1/0272; A01K 1/03; A01K 1/031; A01K 1/033; A01K 1/034; A01K 1/035; A01K 1/0356; A01K 7/02; A01K 29/00; A01K 29/005; A01K 1/0281; A01K 1/00; A01K 45/005; A01K 31/002; A01K 31/07; A01K 1/032; B60P 3/04;
(Continued)

(56) References Cited

U.S. PATENT DOCUMENTS 3,662,712 A * 5/1972 Singer ................. A01K 1/0236
                                                    119/453
3,710,761 A * 1/1973 Gregory ............... A01K 1/0245
                                                    119/496
(Continued)

FOREIGN PATENT DOCUMENTS

JP       2008208699 A *  9/2008   ....... B64D 11/00152

OTHER PUBLICATIONS

Extended European Search Report for EP 181752627.7-1010, dated Aug. 20, 2018.

*Primary Examiner* — Kathleen I Alker
(74) *Attorney, Agent, or Firm* — Philip S. Hof; The Small Patent Law Group, LLC (57) ABSTRACT

A pet travel system includes a pet storage module and a closet within an interior cabin of a vehicle. The pet storage module has multiple module walls and a door that enclose a cavity configured to receive a pet. The pet storage module includes one or more first latch members attached to one or more of the module walls. The closet includes closet walls defining a compartment sized to receive the pet storage module therein. The closet further includes one or more second latch members attached to one or more of the closet walls. Each second latch member is configured to releasably connect to a corresponding first latch member to secure the pet storage module within the closet during a trip of the vehicle.

22 Claims, 8 Drawing Sheets

(51) Int. Cl.
  *A01K 1/015* (2006.01)
  *A01K 7/02* (2006.01)
  *A01K 1/02* (2006.01)

(52) U.S. Cl.
  CPC .......... *A01K 1/0157* (2013.01); *A01K 1/0245* (2013.01); *A01K 7/02* (2013.01); *A01K 29/005* (2013.01)

(58) Field of Classification Search
  CPC ....... B64D 11/00; B64D 11/003; B64D 11/04; B64D 9/00; B60R 5/00; B61D 3/163; B61D 16/16
  See application file for complete search history.

(56) References Cited

U.S. PATENT DOCUMENTS

| | | | | |
|---|---|---|---|---|
| 3,727,581 | A * | 4/1973 | Brent | A01K 1/0236 119/453 |
| 4,085,705 | A * | 4/1978 | Gland | A01K 1/031 119/418 |
| 4,183,323 | A * | 1/1980 | Maines | A01K 13/001 119/416 |
| 5,117,777 | A * | 6/1992 | Takasugi | A01K 63/02 119/203 |
| 5,651,330 | A * | 7/1997 | Jewett | A01K 1/0236 119/408 |
| 5,735,233 | A * | 4/1998 | Deitrich | A01K 1/031 119/452 |
| 5,749,321 | A * | 5/1998 | Ikuse | A01K 1/031 119/456 |
| 5,826,545 | A * | 10/1998 | Steffes | A01K 1/031 119/473 |
| 5,931,120 | A | 8/1999 | Burns et al. | |
| 6,058,886 | A * | 5/2000 | Haines | A01K 13/001 119/601 |
| 6,076,485 | A * | 6/2000 | Peeples | A01K 1/0254 119/496 |
| 6,318,295 | B1 * | 11/2001 | Wade | A01K 1/03 119/421 |
| 6,338,316 | B1 * | 1/2002 | Weaver | A01K 31/002 119/453 |
| 7,389,745 | B2 * | 6/2008 | Weaver | A01K 45/005 119/440 |
| 7,487,744 | B1 * | 2/2009 | Goldberg | A01K 1/031 119/453 |
| 7,520,468 | B2 * | 4/2009 | Doebertin | A63H 33/008 244/118.5 |
| 8,037,847 | B2 * | 10/2011 | Malnati | A01K 1/031 119/419 |
| 9,247,711 | B2 * | 2/2016 | Reginhard | A01K 1/0272 |
| 2001/0045190 | A1 * | 11/2001 | Pivonka | A01K 1/0245 119/498 |
| 2004/0211368 | A1 * | 10/2004 | Chen | A01K 1/0052 119/455 |
| 2005/0284404 | A1 | 12/2005 | Pomakoy-Poole et al. | |
| 2008/0193247 | A1 * | 8/2008 | Zupancich | B65D 19/10 410/92 |
| 2008/0236508 | A1 * | 10/2008 | Seay | A01K 31/002 119/453 |
| 2010/0192870 | A1 | 8/2010 | Wood | |
| 2010/0288204 | A1 * | 11/2010 | Costello | A01K 1/0254 119/453 |
| 2011/0005466 | A1 | 1/2011 | Furth | |
| 2011/0126775 | A1 | 6/2011 | Seltzer | |
| 2012/0085291 | A1 * | 4/2012 | Conger | A01K 1/031 119/419 |
| 2014/0125071 | A1 * | 5/2014 | McWilliams | E05B 17/183 292/336.3 |
| 2016/0054101 | A1 * | 2/2016 | Rashad | A01K 29/00 109/23 |
| 2016/0066535 | A1 * | 3/2016 | Anderson | A01K 1/0245 119/453 |
| 2016/0095290 | A1 | 4/2016 | Reginhard | |
| 2017/0223924 | A1 * | 8/2017 | Grul | A01K 1/0114 |
| 2018/0099752 | A1 * | 4/2018 | Johnson | B64D 11/0601 |

* cited by examiner

PET TRAVEL SYSTEMS AND METHODS ON A VEHICLE

FIELD OF EMBODIMENTS OF THE DISCLOSURE

Embodiments of the present disclosure generally relate to systems and methods of transporting animal pets onboard a vehicle, such as a commercial aircraft.

BACKGROUND OF THE DISCLOSURE

Many passengers on commercial aircraft, desire traveling with their pets, such as dogs, cats, rabbits, lizards, hamsters, and birds. In order to transport a pet dog, for example, a passenger today typically has at most only two options, and each option has associated disadvantages.

The first option is to transport the pet in a crate within a cargo area underneath the interior cabin where the passengers sit. Since the dog is in a cargo area with luggage, the cargo area may have uncomfortable conditions including dark lighting, hot and/or cold temperatures, loud noises, and the like, which may cause anxiety in certain pets. In addition to being uncomfortable, the fear and confusion of being in a different place without knowing where the dog's owner is may cause the dog to suffer anxiety, which may lead to health problems. There have even been documented cases of pet deaths in the custody of commercial airline operators due to conditions suffered by the pets within the cargo area of the aircraft or on the tarmac outside of the aircraft. Furthermore, the dog's owner in the interior cabin may worry about the condition of the dog in the cargo area during the trip, elevating the anxiety of the owner and reducing the owner's enjoyment of the trip.

The second option that is only available for certain pets that meet specific restrictions (e.g., types of pet, sizes, behaviors, etc.) is to stow the pet within a bag under a passenger seat in the interior cabin for the duration of the trip. Assuming that a passenger's dog meets the strict criteria, stowing the dog in the cabin near the dog's owner may allay some fears and apprehensions of the owner. Still, the owner may worry that the dog may disturb other passengers, such as by making too much noise or by triggering allergy-related symptoms in allergic passengers nearby. Also, although the ambient conditions within the interior cabin may be more comfortable than in the cargo area, the dog may still be uncomfortable due to being confined in a small bag or crate for several hours. Moreover, by stowing the pet in a bag underneath a seat, the available legroom for the passenger is reduced.

Accordingly, when traveling on a commercial vehicle with a pet today, the pet may experience mild to significant discomfort and/or anxiety, and the owner may also experience discomfort and/or anxiety, regardless of the pet being stowed in the cargo area or in the interior cabin underneath a seat.

SUMMARY OF THE DISCLOSURE

A need exists for a system and method for transporting pets onboard a vehicle, such as a commercial aircraft, that increase pet comfort and reduce owner passenger anxiety. A need exists for storing pets in an interior cabin of a vehicle without stowing the pets underneath passenger seats. A need exists for a system and method of providing amenities and services to pets traveling within an interior cabin of a vehicle to increase the comfort of the pets during the trip.

With those needs in mind, certain embodiments of the present disclosure provide a pet travel system that includes a pet storage module and a closet within an interior cabin of a vehicle. The pet storage module has multiple module walls and a see-through door that enclose a cavity configured to receive a pet. The pet storage module includes one or more first latch members attached to one or more of the module walls. The closet includes closet walls defining a compartment sized to receive the pet storage module therein. The closet further includes one or more second latch members attached to one or more of the closet walls. Each of the first latch members of the pet storage module is configured to releasably connect to a corresponding second latch member to secure the pet storage module within the closet during a trip of the vehicle.

In at least one embodiment, one or more of the module walls of the pet storage module are at least partially covered by a sound-absorbing padding. In at least one embodiment, the pet storage module includes a cushion within the cavity along a bottom wall, and the cushion has a moisture-absorbing layer. In at least one embodiment, the door of the pet storage module is see-through and defines air holes therethrough for ventilation.

The pet storage module may also include an electric fan mounted through an opening in the door to ventilate the cavity. The pet storage module may also include a water dispenser mounted to an inner surface of one of the module walls or the door. The pet storage module may also include a camera mounted to one of the module walls or the door. The camera acquires image data of the pet within the cavity, and the image data is communicated to a display device that is visible to a passenger on the vehicle.

The closet of the vehicle may also include configurable partition walls that are removable to selectively configure a size of the compartment that receives the pet storage module and a location of the compartment within the closet. The closet walls may define multiple compartments that are spaced apart within the closet such that multiple pet storage modules can be secured within the same closet during the trip of the vehicle. The closet may be located in a main interior cabin of the vehicle.

Certain embodiments of the present disclosure provide a pet travel method that includes providing a pet storage module having a cavity configured to accommodate a pet therein. The pet storage module includes multiple module walls and a door that enclose the cavity. The pet storage module includes one or more first latch members attached to one or more of the module walls. The method also includes loading the pet storage module into a closet of an interior cabin of a vehicle. The loading comprises positioning the pet storage module within a compartment of the closet defined by closet walls. The method further includes releasably connecting the one or more first latch members of the pet storage module to one or more second latch members of the closet, and securing the pet storage module within the closet during a trip of the vehicle.

Certain embodiments of the present disclosure provide a pet travel system including a pet storage module that has a front end and a rear end. The pet storage module includes a housing that is open at the front end. The pet storage module includes a door at the front end. The door and the housing enclose a cavity configured to receive a pet through the door. The pet storage module includes one or more latch members mounted to the housing along an exterior surface of the housing. The one or more latch members are located at least proximate to the rear end. The pet storage module is configured to be loaded rear-end-first into a closet within an interior cabin of a vehicle such that the one or more latch members releasably connect to one or more complementary mating latch members within the closet to secure the pet storage module in the closet during a trip of the vehicle.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a pet travel system that includes a pet storage module that is configured to receive and contain a live pet animal, such as a dog, cat, bird, rabbit, hamster, lizard, or the like. As used herein, the term "pet travel system" is used interchangeably with the terms "pet suite" and "main cabin pet suite". The pet storage module is configured to be loaded into a closet or other such monument on a vehicle that has a planned trip, such that the pet travels during the trip within the pet storage module that is located in the closet. The closet may be located in an interior cabin of the vehicle that is a main interior cabin. Human passengers on the vehicle may be seated within the main interior cabin, such that pet is at least near the passengers, as opposed to being below the passengers in a cargo area of the vehicle.

The pet storage module may have several amenities for the pet designed to increase the comfort level of the pet and the pet's owner. For example, the pet storage module may include a padded cushion on which the pet can lay, and optionally may also include padded side walls. The pet storage module may include an electric fan for ventilation, a water dispenser, a bowl for water and/or food, dimmable lighting, and/or the like. The pet storage modules may be available in multiple different sizes to provide a desired amount of space for a given pet to comfortably lay, stand, stretch, walk, and even urinate, if necessary, within the pet storage module.

In order to increase the comfort level of the pet owner, the owner may be able to walk up to the pet storage module during the trip to check on the pet. Optionally, the pet storage module may also include a camera positioned to acquire image data of the pet within the pet storage module, and the image data may be communicated to the pet's owner such that the owner can view the pet without getting out of the owner's seat. For example, the image data may be presented to the owner via a headrest display monitor on a passenger seat in front of the owner or via the owner's personal mobile device, such as a smartphone, tablet computer, or laptop computer.

The closet of the vehicle may be reconfigurable to increase the utility of the closet space. For example, space within the closet may be configured to accommodate one or more pet storage modules having the same or different sizes. The space in the closet that is not occupied by the pet storage modules can be used for storing pet bags and pet-related accessories and/or non-pet-related items, such as strollers, luggage, bags, car seats, coats, hats, umbrellas, and the like. The space within the closet may be configurable by selectively moving and/or removing partition walls within the closet.

The systems and method of the present disclosure provide pet owners with a new option for pet travel on vehicles that is more comfortable for the pet than conventional pet travel options that include stowing the pets within the cargo area or under passenger seats. The pet travel system disclosed herein does not interfere with passenger-related operations in the interior cabin because the pet travel system occupies the same space as a pre-existing closet. As such, the pet travel system makes efficient use of available space within the vehicle. The pet travel system may also be desirable for pet owners because the owners are able to check on their pets during a trip, either directly by walking up to the closet or indirectly via a camera feed of the pet in the storage module, without worrying about the conditions and/or health of their pets under seats or within the cargo area. The pet travel system may also allow the owners to interact with the pets during the trip, such as by opening a door to the pet storage module or a panel within the door, to reach into the pet storage module and access the pet. The systems and method of the present disclosure also may provide passenger carriers (e.g., airlines, rail companies, etc.) with an additional revenue source by renting space within the main cabin of the vehicle that was previously not rented.

Figure 1:
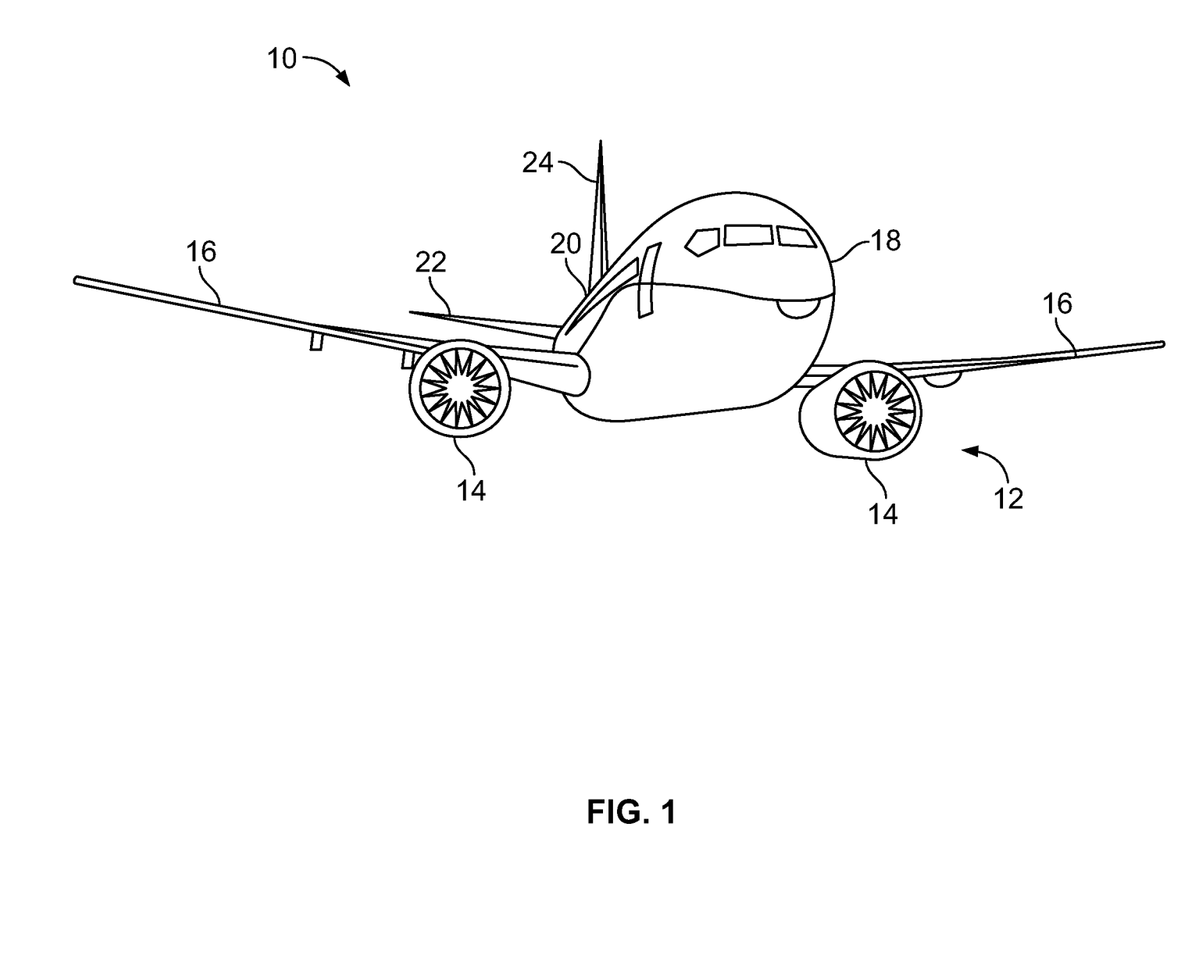
FIG. 1 is a diagrammatic representation of a front perspective view of an aircraft, according to an embodiment of the present disclosure.

FIG. 1 is a diagrammatic representation of a front perspective view of a vehicle, such as an aircraft 10 (or aircraft assembly), according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and economy sections), and an aft section. Each of the sections may be separated by a cabin transition area, which may include one or more class divider assemblies. Overhead stowage bin assemblies may be positioned throughout the interior cabin.

Alternatively, instead of an aircraft, embodiments of the present disclosure may be used with various other vehicles, such as automobiles, buses, rail vehicles (e.g., locomotives and train cars), seacraft, spacecraft, vehicles that move within reduced-pressure tubes, and the like.

Figure 2A:
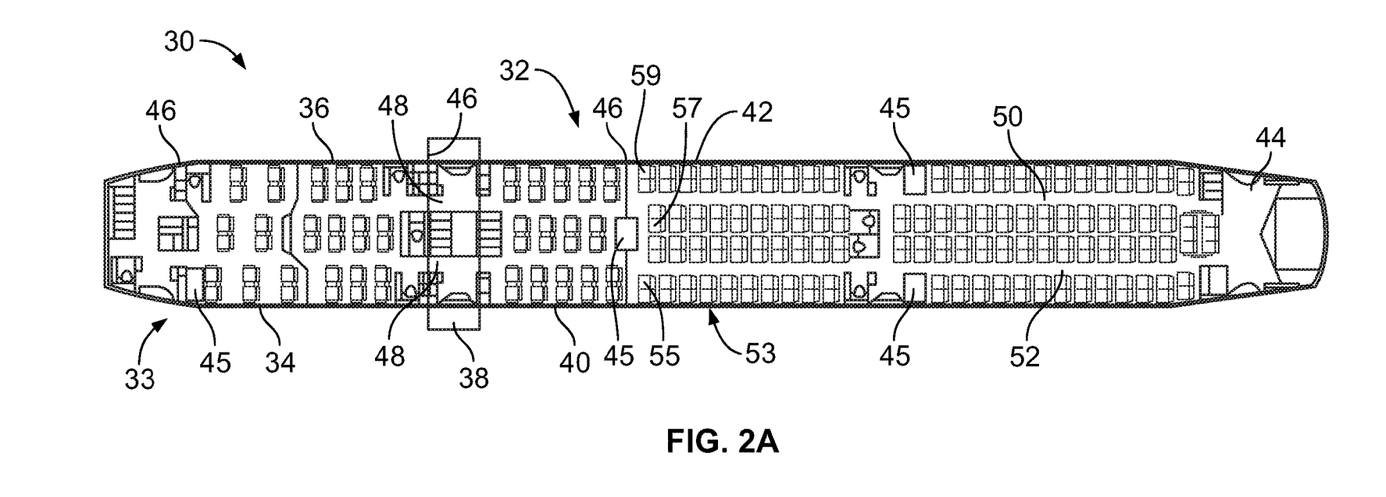
FIG. 2A is a diagrammatic representation of a top plan view of an interior cabin of an aircraft, according to an embodiment of the present disclosure.

FIG. 2A is a diagrammatic representation of a top plan view of an interior cabin 30 of an aircraft, according to an embodiment of the present disclosure. The interior cabin 30 is within a fuselage 32 of the aircraft 10 (shown in FIG. 1). For example, one or more fuselage wall members may define the interior cabin 30. The interior cabin 30 includes multiple sections or zones, including a front section 33, a first class section 34, a business class section 36, a front galley station 38, a business or an expanded economy or coach section 40, a standard economy or coach section 42, and an aft section 44, which may include multiple lavatories and galley stations. The interior cabin 30 includes several closets 45 located within different sections. Each of the closets 45 may be used as a pet travel system or a main cabin pet suite according to embodiments of the present disclosure described herein. Although four closets 45 are shown in FIG. 2A, the aircraft may have different numbers and/or locations of the closets 45 in other embodiments. It is to be understood that the interior cabin 30 may include more or less sections and zones than shown. For example, the interior cabin 30 may not include a first class section, and may include more or less galley stations than shown. Each of the sections may be separated by a cabin transition area 46, which may include class divider assemblies between aisles 48.

As shown in FIG. 2A, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44.

As shown, rows 53 of seats are within the interior cabin 30. A row 53 spans across the interior cabin and generally extends across the aisles 50 and 52. Columns 55, 57, and 59 of seat sections are perpendicular to the rows 53. Each seat section may include one or more seats. The columns 55, 57, and 59 generally run parallel with the aisles 50 and 52. A particular section or zone may include any number of columns 55, 57, and 59 of seat sections. As shown in FIG. 2A, at least one zone includes three columns 55, 57, and 59 of seat sections. However, each zone may include more or less than three columns. For example, a first class section or zone may include two columns of seat sections.

Figure 2B:
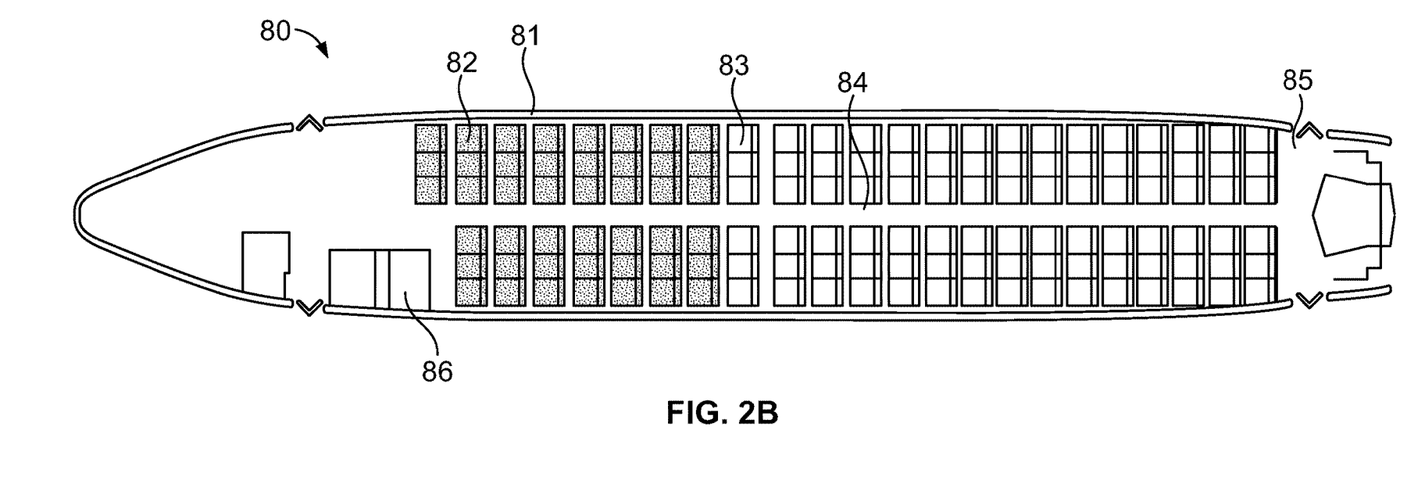
FIG. 2B is a diagrammatic representation of a top plan view of an interior cabin of an aircraft, according to another embodiment of the present disclosure.

FIG. 2B is a diagrammatic representation of a top plan view of an interior cabin 80 of an aircraft, according to another embodiment of the present disclosure. The interior cabin 80 may be within a fuselage 81 of the aircraft. For example, one or more fuselage wall members may define the interior cabin 80. The interior cabin 80 includes multiple sections or zones, including a main cabin 82 having passenger seats 83, and an aft section 85 behind the main cabin 82. The interior cabin 80 also includes a closet 86 which may be used for conventional storage of items or as a main cabin pet suite, as described herein. It is to be understood that the interior cabin 80 may include more or less sections or zones than shown.

The interior cabin 80 may include a single aisle 84 that leads to the aft section 85. The single aisle 84 may extend through the center of the interior cabin 80 that leads to the aft section 85.

Figure 3:
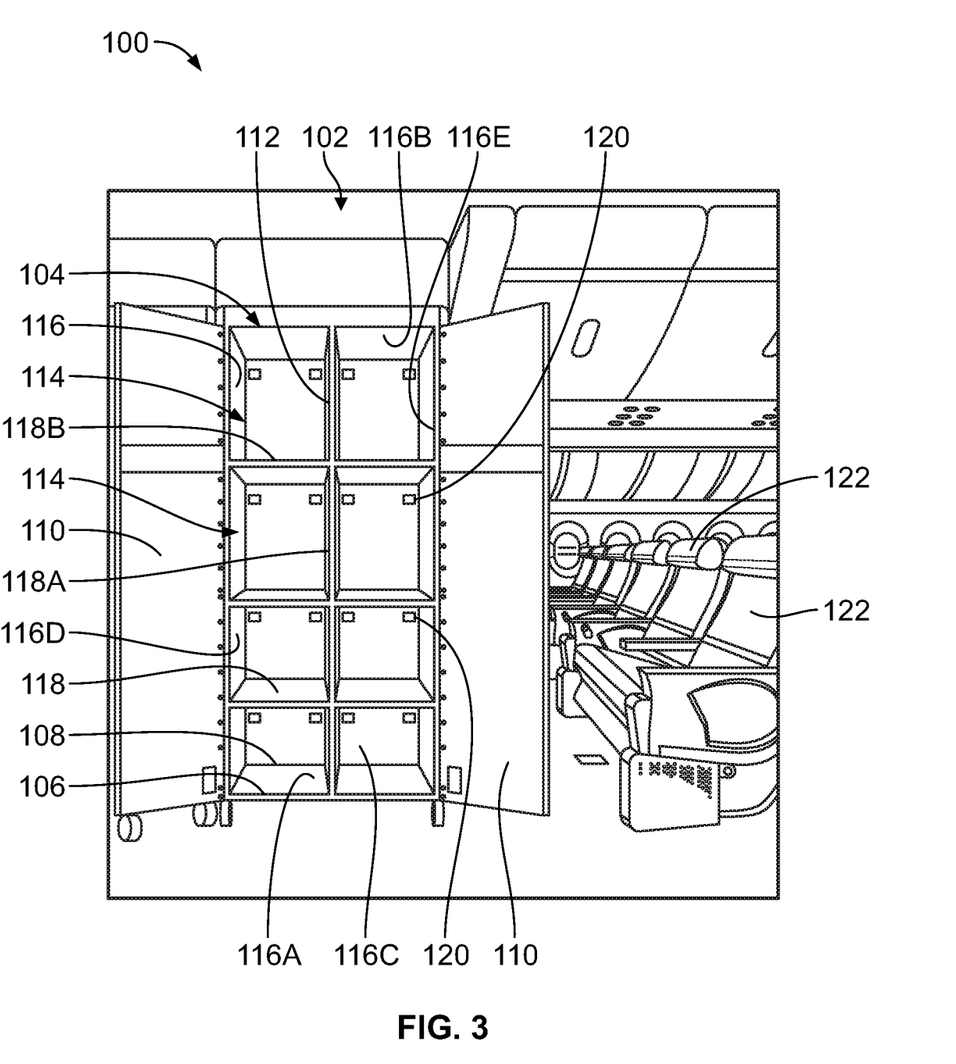
FIG. 3 illustrates a section of an interior cabin of a vehicle showing a configurable closet, according to an embodiment of the present disclosure.

FIG. 3 illustrates a section of an interior cabin 102 of a vehicle 100 showing a configurable closet 104, according to an embodiment of the present disclosure. The vehicle 100 may be an aircraft, a rail vehicle, a marine vessel, or the like. The closet 104 extends a depth between a front end 106 and an opposite rear end 108. The closet 104 has two doors 110 that are connected via hinges at the front end 106. The doors 110 are shown in open positions such that the interior of the closet 104 is accessible to a passenger or an attendant of the vehicle.

The closet 104 includes multiple closet walls 112 that define at least one compartment 114. The closet walls 112 in the illustrated embodiment include fixed frame walls 116 and removable partition walls 118. The frame walls 116 define a perimeter of the closet 104. The frame walls 116 include a bottom wall 116A, a top wall 116B, a back wall 116C, and opposing side walls 116D, 116E. Each of the frame walls 116 extends from the front end 106 to the rear end 108 of the closet 104. The doors 110 are connected to the side walls 116D, 116E. The frame walls 116 structurally support the closet 104, and are generally not removable without disassembling the closet 104.

The partition walls 118 are configured to be selectively movable and/or removable relative to the frame walls 116. In the illustrated embodiment, the partition walls 118 include vertical columns 118A and horizontal shelves 118B. In an alternative embodiment, the partition walls 118 include only one or more vertical columns 118A or only one or more horizontal shelves 118B. The compartments 114 are defined by the partition walls 118 and the frame walls 116. There are eight discrete compartments 114 in the illustrated configuration. Optionally, there may be more or less than eight discrete compartments 114. The partition walls 118 can be moved and/or removed from the closet 104 to vary the number of compartments 114 within the closet 104, as well as the sizes and locations or arrangement of the different compartments 114. The compartments 114 can be used to hold various passenger-related items, such as bags, luggage, coats, hats, car seats, strollers, and the like. The compartments 114 can also be used to hold attendant-related items, such as personal items of attendants on the aircraft and/or aircraft supplies. When the doors 110 are closed, the items within the interior of the closet 104 are obstructed from view behind the doors 110.

In at least one embodiment, the closet 104 is usable as a main cabin pet suite for traveling with pets within the interior cabin 102. For example, the closet 104 includes multiple latch members 120 mounted within the closet 104. The latch members 120 are mounted to the back frame wall 116C of the closet 104. Optionally, at least some of the latch members 120 may be mounted to walls of the closet 104 other than the back wall 116C. The latch members 120 are configured to releasably connect to complementary latch members 208 (shown in FIG. 5) on pet storage modules 202 (FIG. 5) to secure the pet storage modules 202 within the closet 104 during a trip. The latch members 120 may be arranged in an array along the back frame wall 116C, such as in rows and columns, which allows for loading pet storage modules in various locations within the closet 104. Optionally, at least some of the latch members 120 may be mounted to the side walls 116 and/or the partition walls 118 instead of, or in addition to, mounting latch members 120 to the back wall 116C. As shown in FIG. 3, the closet 104 is near passenger seats 122. Thus, if the closet 104 contains one or more pet storage modules, passengers may be able to view the pets within the pet storage modules 202 from their seats 122 and/or by walking up to the closet 104.

Figure 4:
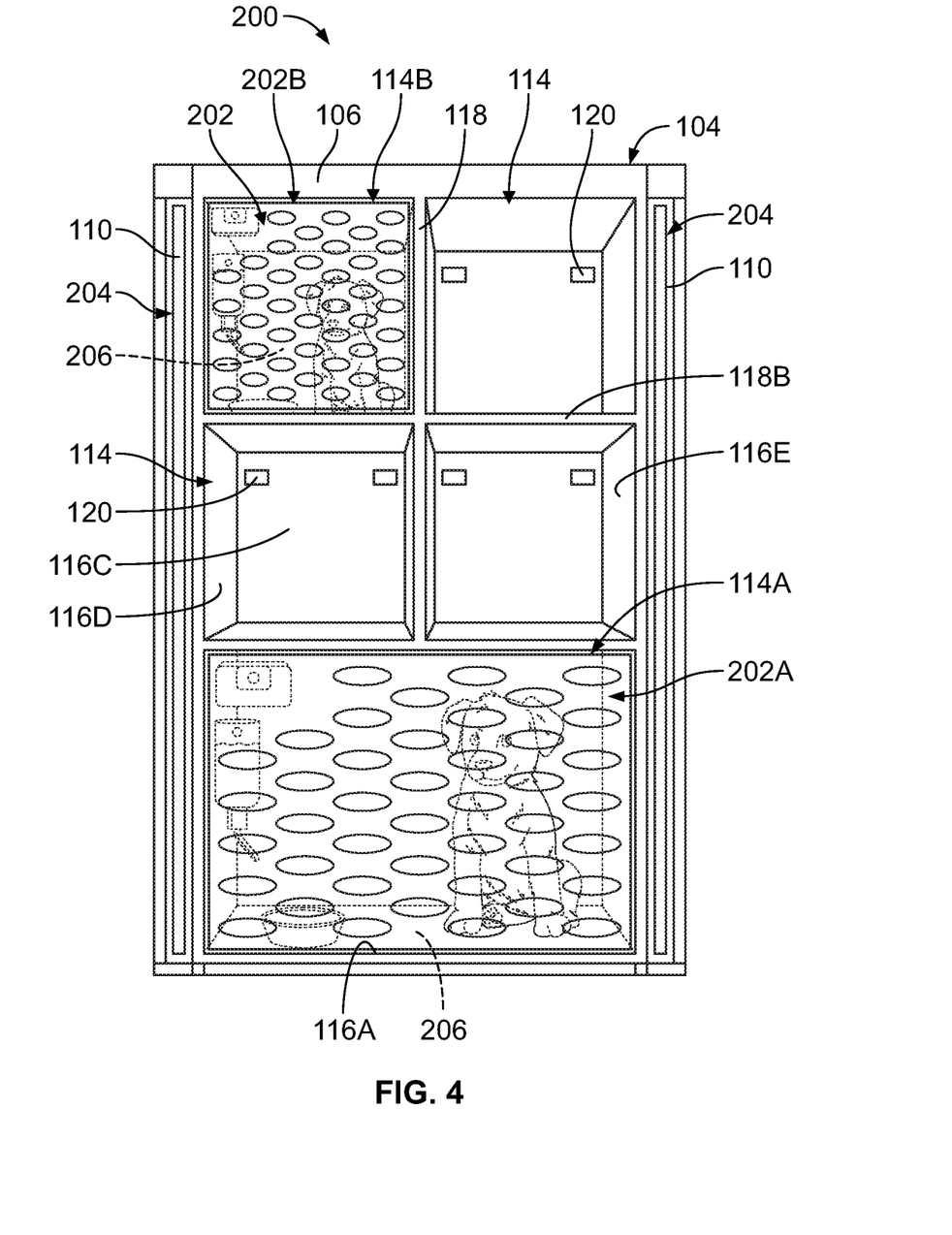
FIG. 4 illustrates a pet travel system that includes the configurable closet of the vehicle, according to an embodiment of the present disclosure.

FIG. 4 illustrates a pet travel system 200 that includes the configurable closet 104 of the vehicle 100 (shown in FIG. 3), according to an embodiment of the present disclosure. The pet travel system 200 is designed to safely and comfortably transport live animals within the interior cabin 102 (shown in FIG. 3) during a trip of the vehicle 100.

The pet travel system 200 in FIG. 4 includes the configurable closet 104 and two pet storage modules 202 held within corresponding compartments 114 of the closet 104. One of the pet storage modules 202A is larger than the other pet storage module 202B. The pet within the pet storage module 202A may be larger than the pet within the pet storage module 202B, thus requiring more space. Optionally, the owner of the pet within the pet storage module 202A may choose the larger-sized module 202A in order to provide the pet with more space for moving within the module 202A during the trip. As compared to the configuration of the closet 104 in FIG. 3, some of the partition walls 118 have been removed to accommodate the pet storage module 202A. As a result, the closet 104 defines five compartments 114 in FIG. 4 instead of the eight compartments 114 in FIG. 3. The sizes of the compartments 114 may be based on the sizes of the pet storage modules 202 that are received in the compartments 114. For example, the larger pet storage module 202A is received in a compartment 114A that is larger than the compartment 114B that receives the smaller pet storage module 202B. Although two pet storage modules 202 are shown in FIG. 4, it is recognized that additional pet storage modules 202 may be loaded into the closet 104, depending on the available space and the sizes of the pet storage modules 202. In the illustrated embodiment, there are three unoccupied compartments 114, which can be used for storing one or more additional pet storage modules 202 or pet-related items (e.g., pet carrying bags, pet supplies, or the like). The unoccupied compartments 114 can also be used for storing other, non-pet-related items, such as passenger luggage, coats, bags, vehicle attendant supplies, or the like.

In at least one embodiment, the doors 110 of the closet 104 are retractable and/or removable in order to allow the passengers to view the pet storage modules 202 and to allow the pets within the per storage modules 202 to view the interior cabin 102 (shown in FIG. 3) outside of the closet 104. In the illustrated embodiment, the doors 110 are retractable and are inserted into slots 204 along the outside of the side walls 116D, 116E. Alternatively, the doors 110 may be foldable (e.g., like an accordion) or removable entirely from the closet 104. By retracting the doors 110, the pet storage modules 202 are visible at the front end 106 of the closet 104. The pet storage modules 202 each have a see-through door 206 that aligns generally with the front end 106. Therefore, the pet within the pet storage module 202 is able to view the interior cabin 102 outside of the closet 104, and passengers in front of the closet 104 are able to view the pets within the pet storage modules 202. For example, the see-through door 206 may be a cage, mesh, screen, or the like. In at least one embodiment, the see-through door 206 may include at least a solid, transparent portion, such as a glass or plexiglass portion. As described above, being able to see people outside of the closet 104 may reduce stress and anxiety experienced by the pets, and may provide peace of mind to the owners of the pets who are able to view the pets within the pet storage modules 202. In addition, if only some of the space within the closet 104 is used for carrying pet storage modules 202, such as only a first half of the closet 104, the second half of the closet 104 can be used for storing items. While the door 110 along the first half is open (e.g., retracted, inserted into the slot 204, or removed), the door 110 along the second half of the closet 104 can be closed in order to block the view of the items therein.

The pet storage modules 202 are secured within the compartments 114 to prevent the pet storage modules 202 (and the pets therein) from moving relative to the closet 104 during the trip. For example, the pet storage modules 202 each include at least one latch member 208 (shown in FIG. 5) mounted to an exterior of the pet storage module 202. The latch members 208 are complementary to the latch members 120 mounted within the closet 104. As used herein, the latch members 208 and the latch members 120 are also referred to as "first" and "second" latch members merely to distinguish between the different latch members. For example, the latch members 208 may be referred to as "first latch members" in some instances, and as "second latch members" in other instances. Similarly, the latch members 120 are referred to as "first latch members" or "second latch members" to distinguish from the latch members 208 in each instance.

When each pet storage module 202 is loaded into a corresponding compartment 114, the one or more latch members 208 thereof are configured to releasably connect to corresponding latch members 120 within the compartment 114. The connection between the latch members 208, 120 secures the pet storage module 202 within the closet 104, preventing the pet storage module 202 from sliding or falling out of the closet 104 through the opening at the front end 106 (since the doors 110 are retracted). Optionally, the latch members 208 may also support at least some of the weight of the pet storage modules 202, such that the pet storage modules 202 are at least partially suspended by the latching mechanism (defined by the latch members 208, 120). Alternatively, the pet storage modules 202 are supported by the shelves 118B and/or the bottom wall 116A of the closet 104. In another embodiment, the pet storage modules 202 may be at least partially supported by guide tracks, such as in the embodiment shown and described with reference to FIG. 9.

Figure 5:
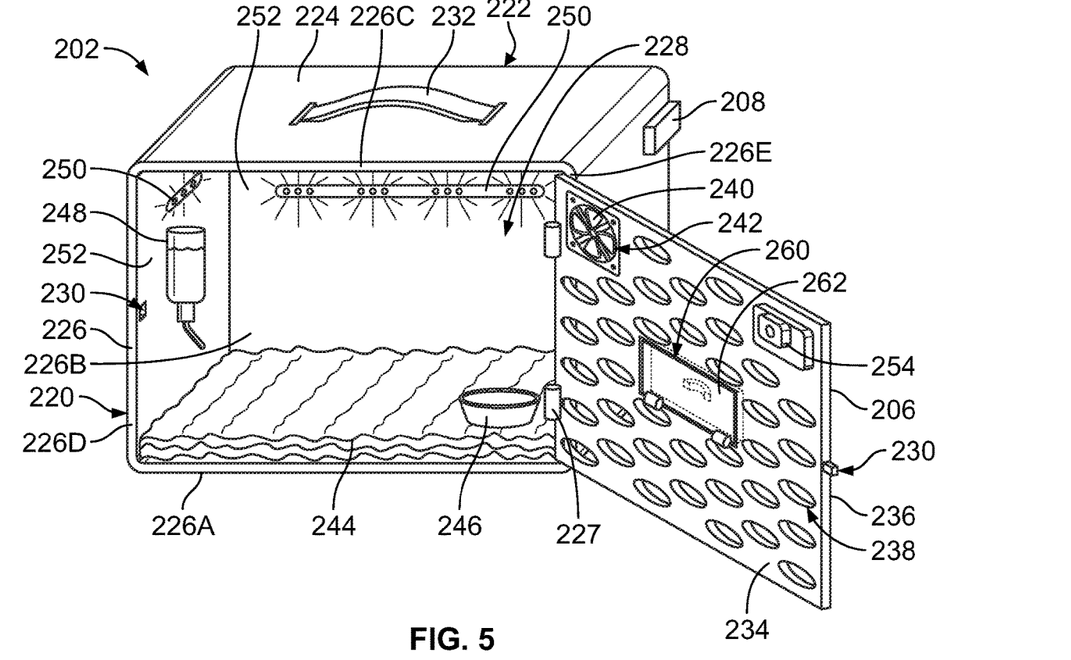
FIG. 5 is a perspective view of a pet storage module of the pet travel system, according to an embodiment of the present disclosure.

FIG. 5 is a perspective view of a pet storage module 202 according to an embodiment of the present disclosure showing the door 206 of the pet storage module 202 in an open position. In an embodiment, the pet storage modules 202 of the pet travel system 200 shown in FIG. 4 may have different sizes, but may also share many features and characteristics in common. Therefore, the description of the pet storage module 202 in the illustrated embodiment may be applicable to pet storage modules 202 of different sizes.

The pet storage module 202 has a front end 220 and an opposite rear end 222. The pet storage module 202 includes a housing 224 that includes multiple module walls 226. The module walls 226 include a bottom wall 226A on which the pet stands or lays, a rear wall 226B opposite the door 206, and at least one side wall. In the illustrated embodiment, the housing 224 is a rectangular prism and further includes a top wall 226C and two side walls 226D, 226E. In other embodiments, the housing 224 may have more or less than the four walls 226A, 226C, 226D, 226E extending between the rear wall 226B and the door 206, such that the housing 224 may have a triangular prism shape, a hexagonal prism shape, a partially cylindrical shape, or the like. The housing 224 is connected to the door 206 via hinges 227. The module walls 226 of the housing 224 and the door 206 define a cavity 228 that receives the pet therein. When the door 206 is closed, the cavity 228 is fully enclosed, preventing the pet from escaping from the pet storage module 202. The door 206 may be releasably secured in the closed position using a locking mechanism 230.

The pet storage module 202 includes one or more latch members 208 on an exterior surface of the housing 224. In FIG. 5, only one latch member 208 is visible, and is mounted to the side wall 226E. Although not shown, the pet storage module 202 may include another latch member 208 mounted to the side wall 226D. The one or more latch members 208 are located at or proximate to the rear end 222 of the pet storage module 202. Therefore, the latch members 208 are able to engage corresponding latch members 120 on the back wall 116C of the closet 104, as shown in FIG. 4. In an alternative embodiment, the latch members 208 may be located more proximate to the front end 220. For example, the complementary latch members 120 in the closet 104 may be mounted on the closet walls 112 more proximate to the front end 106 of the closet 104.

In an embodiment, the housing 224 is composed of a metal material, composite, and/or a polymer material, such as a plastic. For example, the module walls 226 may be lattices of criss-crossing metal bars, or may be panels of plastic or metal. The module walls 226 may define openings for ventilation. The module walls 226 may be at least partially covered by a sound-absorbing padding for muffling sounds emitted from the pet within the cavity 228. The housing 224 optionally includes at least one handle 232 that allows a person to pick up the pet storage module 202 for loading and unloading the pet storage module 202 relative to the closet 104. Optionally, larger pet storage modules 202 may include additional handles for multiple persons to grasp. The larger pet storage modules 202 also may include wheels (not shown) located under the bottom wall 226A that allow the modules 202 to be wheeled instead of carried.

The door 206 of the pet storage module 202 is see-through. For example, the door 206 may be at least partially transparent or translucent. The door 206 may be composed of a glass or a polymer. In at least one other embodiment, the door 206 may be a cage, screen, or mesh. The door 206 includes an inner surface 234 and an opposite outer surface 236. In an embodiment, the door 206 includes air holes 238 that extend through the door 206 between the inner and outer surfaces 234, 236 to provide ventilation for the pet within the cavity 228. The air holes 238 may have various sizes, with dimensions (e.g., diameters) ranging from centimeters down to micrometers. For example, in the illustrated embodiment, the air holes 238 are visible and have dimensions in the millimeter and/or centimeter range, such as between about 2 mm and about 20 mm (i.e., 2 cm). However, in an alternative embodiment, the door 206 may be composed of a porous material that includes very small air holes.

In an embodiment, the pet storage module 202 also includes an electric fan 240 that is mounted in an opening 242 defined through the door 206 between the inner and outer surfaces 234, 236. The fan 240 is configured to actively ventilate the cavity 228. The fan 240 may be battery powered, solar powered, and/or powered via the electrical power system on the vehicle using an electrical cable to provide a wired connection. Alternatively, the fan 240 may be mounted through an opening in a module wall 226 instead of the door 206. The air flow provided by the fan 240 may also reduce the amount of pet hair that is released from the pet storage module 202 into the interior cabin.

The pet storage module 202 also includes various other amenities, such as a cushion 244 within the cavity 228 located on the bottom wall 226A, a bowl 246 for water and/or food, a water dispenser 248, lights 250, and/or the like. The water dispenser 248 is mounted to an inner surface 252 of the side wall 226D, but may be mounted to the door 206 or another wall 226 in another embodiment. The inner surface 252 faces and at least partially defines the cavity 228. The bowl 246 is shown placed on top of the cushion 244. The pet storage module 202 in another embodiment may include a mount attached to one of the walls 226 for suspending the bowl 246 above the cushion 244, similar to the mounted water dispenser 248. The lights 250 may include one or more LED light strips attached to the inner surface 252 of one or more of the module walls 226. Like the fan 240, the light strips 250 may be powered via battery power, solar power, or the electrical system on the vehicle via a wired connection. The light strips 250 may be dimmable. The pet storage module 202 optionally also includes a camera 254 positioned to acquire image data (e.g., still images and/or video) of the pet within the cavity 228.

In addition, the door 206 optionally may include a window 260 with a movable panel 262 within the window. The panel 262 can be slid or pivoted along hinges relative to the door 206 between a closed position and an open position. The panel 262 in the closed position covers the window 260 and prevents physical access to the pet through the window 260. The panel 262 in the open position exposes the window 260 and allows physical access to the pet within the cavity 228 through the window 260 without opening the door 206. For example, the window 260 can be sized to allow a person's hand to fit through the window 260 for feeding or petting the pet through the door 206

Although various different amenities are shown in FIG. 5, it is understood that the pet storage module 202 in other embodiments may not include all of the shown amenities and/or may include additional amenities that are not shown in FIG. 5.

Figure 6:
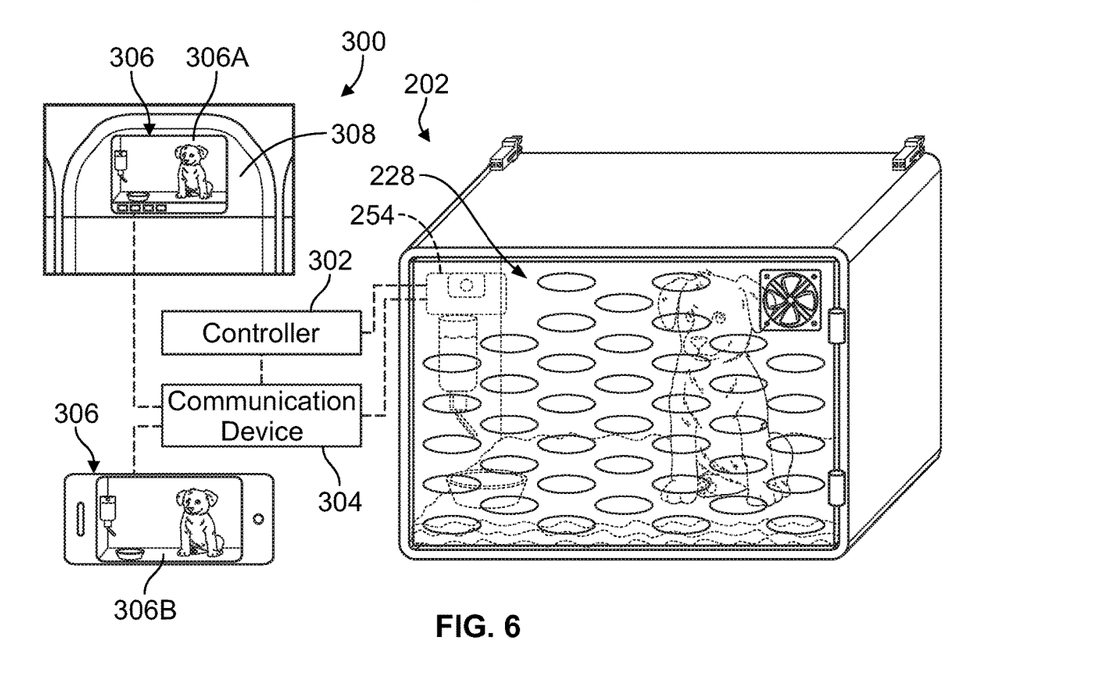
FIG. 6 is a schematic representation of an image communication system for communicating image data of the pet in the pet storage module, according to an embodiment of the present disclosure.

FIG. 6 is a schematic representation of an image communication system 300 for communicating image data of the pet in the pet storage module 202 according to an embodiment of the present disclosure. The communication system 300 includes the camera 254 mounted to the pet storage module 202, a controller 302 including one or more processors, a communication device 304, and various display devices 306 for displaying the image data to one or more passengers on the vehicle.

The controller 302 is configured to control the operation of the image communication system 300. The controller 302 includes and/or represents one or more hardware circuits or circuitry that include, are connected with, or that both include and are connected with one or more processors, controllers, and/or other hardware logic-based devices. The controller 302 may include a central processing unit (CPU), one or more microprocessors, a graphics processing unit (GPU), or any other electronic component capable of processing inputted data according to specific logical instructions. For example, the controller 302 may execute instructions stored on a tangible and non-transitory computer readable medium.

In an embodiment, the camera 254 is positioned to have a field of view that includes the pet within the cavity 228. The camera 254 may be a digital camera that is operatively connected to the controller 302 via a wired or wireless connection. The controller 302 may communicate with the camera 254 by transmitting electrical signals to control when the camera 254 acquires image data of the pet. The controller 302 may also control various properties of the image data acquisition, such as whether the camera 254 acquires still images or video, a frequency at which the camera 254 acquires the image data, a zoom angle of the camera 254, and the like.

The controller 302 is operatively connected to the communication device 304 (via a wired or wireless connection) for communicating the acquired image data of the pet to one or more of the display devices 306. The communication device 304 may include hardware such as a transceiver, receiver, transmitter, and/or the like, and associated circuitry (e.g., antennas) for wirelessly communicating (e.g., transmitting and/or receiving) with the display devices 306. The communication device 304 may also be configured to wirelessly communicate with a server or the like. The communication device 304 may be configured to establish a bi-directional communication link with a display device 306 using protocol firmware that may be stored in a tangible and non-transitory computer readable medium. For example, the protocol firmware may provide network protocol syntax for the communication device 304 to assemble data packets, establish and/or partition data received along the bi-directional communication links, and/or the like.

The display devices 306 in the illustrated embodiment include a headrest touch-screen monitor 306A on the back of a passenger seat 308 and a mobile device 306B, which may be a smart phone or tablet. In an embodiment, a passenger (e.g., such as but not necessarily limited to the owner of the pet within the pet storage module 202) may use one of the display devices 306 to initiate a communication link with the camera 254 mounted to the pet storage module 202. The controller 302 may be used to verify and provide access to the acquired image data. Upon establishment of the communication link, the image data acquired by the camera 254 may be communicated via the communication device 304 to one or more of the display devices 306 for the passenger(s) viewing the display device(s) 306 to be able to see a live feed of the pet. By accessing the live feed using the display device(s) 306, a passenger may be able to view the pet from a remote location within the interior cabin. For example, the passenger may be able to view the pet even though the passenger is seated in an assigned seat 308 remote from the closet that holds the pet storage module 202.

Figure 7:
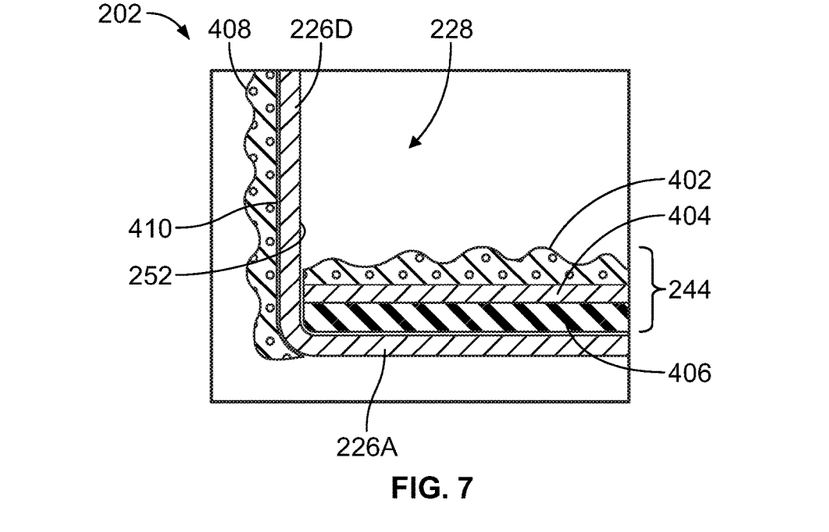
FIG. 7 is a cross-sectional view of a portion of the pet storage module, according to an embodiment of the present disclosure.

FIG. 7 is a cross-sectional view of a portion of the pet storage module 202 according to an embodiment of the present disclosure. The portion of the pet storage module 202 shown is a corner area including lengths of the module side wall 226D and the module bottom wall 226A. The cushion 244 is disposed on the bottom wall 226A within the cavity 228. In an embodiment, the cushion 244 includes multiple different layers composed of different types of materials. For example, an upper layer 402 of the cushion 244 is a sound-absorbing material, which may include a foam, rubber, or elastomeric material. An intermediate layer 404 of the cushion 244 is a moisture-absorbing material, such as an absorbent fabric material. A lower layer 406 of the cushion 244 is a rubber or rubber-like pad that provides cushioning. Although three layers 402, 404, 406 are shown, the cushion 244 may include additional layers or fewer layers in other embodiments. The layers 402, 404, 406 may be bonded to each other via an adhesive. The layers 402, 404, 406 may have a different arrangement in other embodiments. For example, the upper layer 402 may be the moisture-absorbing layer or the rubber pad in an alternative embodiment. The layers 402, 404, 406 of the cushion 244 increase the comfort of the pet by providing a soft cushion that is able to absorb liquid spills. The cushion 244 may be disposable.

In at least one embodiment, the side wall 226D is covered by a sound-absorbing padding 408. The sound-absorbing padding 408 may be the same or similar to the sound-absorbing material in the upper layer 402 of the cushion 244. The sound-absorbing padding 408 is attached to an outer surface 410 of the side wall 226D in the illustrated embodiment. In an alternative embodiment, the sound-absorbing padding 408 may be attached to the interior surface 252 in addition to, or instead of, being attached to the outer surface 410. The sound-absorbing padding 408 is configured to muffle the noises emitted from the pet, such as barks, to reduce the amount of pet noise heard by the passengers. In an embodiment, the sound-absorbing padding 408 may cover other walls of the housing 224 as well, such as the top wall 226C, the side wall 226E and the rear wall 226B (all shown in FIG. 5). Optionally, the sound-absorbing padding 408 may also include a moisture-absorbing layer.

Figure 8:
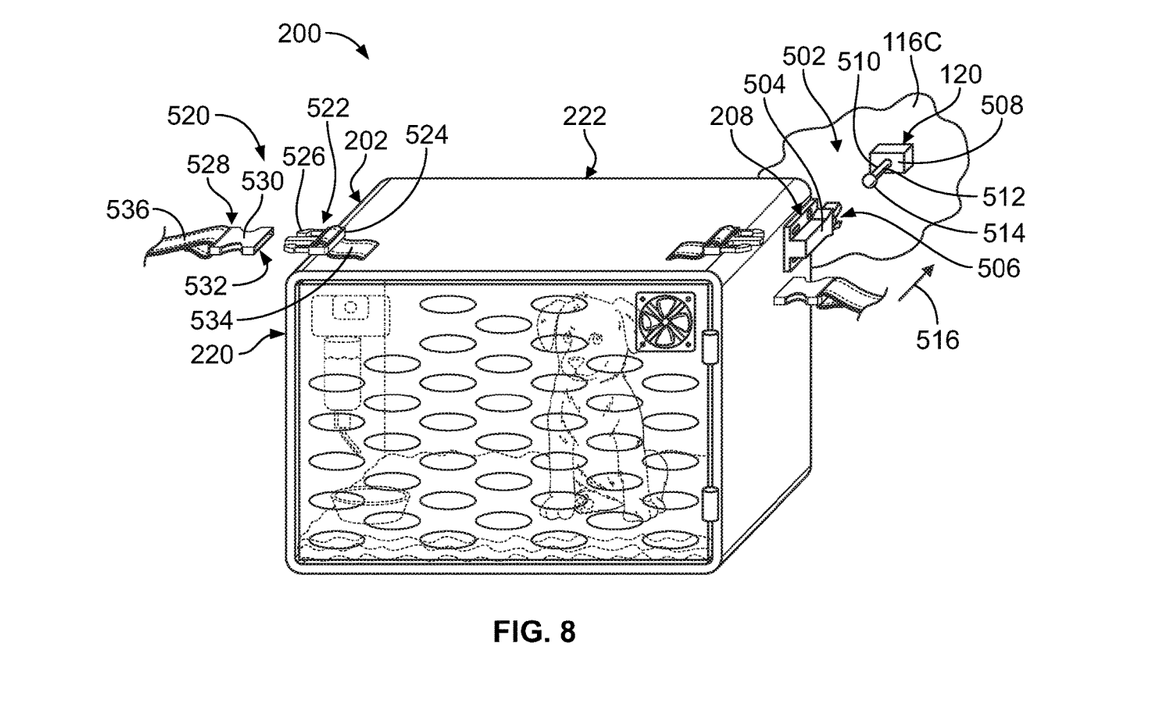
FIG. 8 is a perspective view of a portion of the pet travel system including the pet storage module, according to an embodiment of the present disclosure.

FIG. 8 is a perspective view of a portion of the pet travel system 200 including the pet storage module 202 according to an embodiment of the present disclosure. The pet travel system 200 in the illustrated embodiment includes multiple different types of latching mechanisms for releasably securing the pet storage module 202 within a compartment 114 (shown in FIG. 4) of the closet 104 (FIG. 4). A rear latching mechanism 502 at or proximate to the rear end 222 includes the latch member 208 mounted to the pet storage module 202 and the latch member 120 mounted within the closet 104. The only portion of the closet 104 shown in FIG. 8 is a section of the back wall 116C that includes the latch member 120. The two latch members 208, 120 are complementary. For example, the latch member 208 includes a keeper housing 504 that defines a receptacle 506. The latch member 120 includes a base 508 and an arm 510 extending from the base 508. The arm 510 is configured to be received within the receptacle 506 of the keeper housing 504. The arm 510 includes a post 512 extending from the base 508 and a round head 514 at the distal end of the post 512. The keeper housing 504 is configured to hold (e.g., clamp or catch) the head 514 within the receptacle 506 to secure the latching mechanism 502.

In at least one embodiment, the rear latching mechanism 502 is a push-push latch assembly. For example, upon pushing the pet storage module 202 in a loading direction 516 into the compartment 114 (shown in FIG. 4) of the closet 104 (FIG. 4), the arm 510 is received in the receptacle 506 to connect the two latch members 208, 120. The keeper housing 504 is designed to release the arm 510 (and disconnect the latch assembly) in response to the pet storage module 202 subsequently being pushed farther in the loading direction 516. Thus, the latch assembly is connected and also disconnected by movement in the same direction. Once the rear latching mechanism 502 is disconnected, the pet storage module 202 can be removed from the closet 104 (assuming the pet storage module 202 is not connected to the closet 104 via other latching mechanisms). Optionally, the latch members may be reversed such that the latch member 208 mounted to the pet storage module 202 includes the base 508 and arm 510, and the latch member 120 mounted in the closet 104 includes the keeper housing 504 and receptacle 506.

In the illustrated embodiment, the pet travel system 200 also includes a front latching mechanism 520 that is different type of assembly than the rear latching mechanism 502. For example, the front latching mechanism 520 is a side-releasable buckle assembly. A male latch member 522 of the buckle assembly 520 is attached to the pet storage module 202 at or proximate to the front end 220. The male latch member 522 includes a base 524 and multiple arms 526 extending from the base 524. A complementary female latch member 528 of the buckle assembly 520 is configured to be attached to the closet 104 (shown in FIG. 4), although the attachment is not shown in FIG. 8. The female latch member 528 includes a keeper housing 530 that defines a receptacle 532 configured to receive the arms 526 therein to connect the buckle assembly 520. The buckle assembly 520 can be manually disconnected by forcing the two outer arms 526 towards each other to release the arms 526 from engagement with the keeper housing 530. By including latching mechanisms at both the front and rear ends 220, 222 of the pet storage module 202, the pet storage module 202 may be secured within the closet 104 with only a limited amount, if any, of permitted movement relative to the closet 104.

The male latch members 522 may be attached to the pet storage module 202 via straps 534. The female latch members 528 of the buckle assembly 520 may also include straps 536 that connect the latch members 528 to the corresponding walls of the closet 104. The straps 534, 536 may allow for adjusting the tension between the pet storage module 202 and the walls of the closet 104.

Optionally, the pet travel system 200 includes the front latching mechanism 520 (e.g., the buckle assembly) or the rear latching mechanism 502, but not both. For example, the walls of the closet 104 (e.g., the side frame wall 116D, the side frame wall 116E, and/or the vertical columns 118A shown in FIG. 3) may sufficiently limit the amount of permitted lateral movement of the pet storage module 202. Therefore, the front latching mechanism 520 or the rear latching mechanism 502 provides forward-backward or longitudinal retention of the pet storage module 202, and the walls of the closet 104 provide side-to-side or lateral retention of the pet storage module 202.

Although a push-push latch assembly and a buckle assembly are described, it is recognized that the one or more latching mechanisms that releasably secure the pet storage module 202 within a corresponding compartment 114 of the closet 104 can have various other latching designs, such as a push-pull latch assembly or the like.

Figure 9:
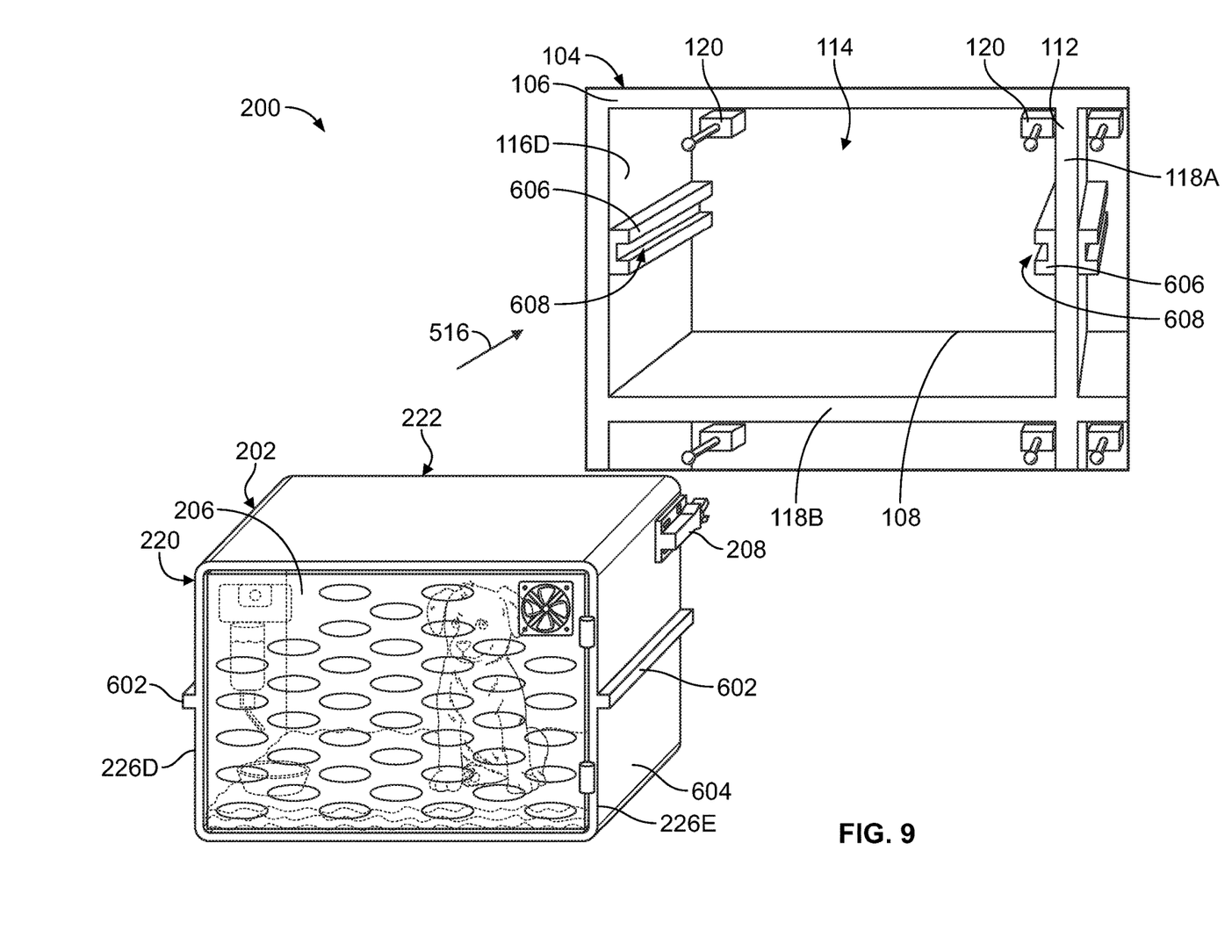
FIG. 9 is a perspective view of a portion of the pet travel system, according to an embodiment of the present disclosure, showing a pet storage module poised for loading into a compartment of the closet.

FIG. 9 is a perspective view of a portion of the pet travel system 200 according to an embodiment of the present disclosure showing one pet storage module 202 poised for loading into a compartment 114 of the closet 104. The pet storage module 202 is loaded into the compartment 114 rear-end-first, such that the rear end 222 enters the compartment 114 before the front end 220. When the pet storage module 202 is loaded in the compartment 114, the front end 220 of the module 202 aligns with (or is at least proximate to) the front end 106 of the closet 104. Therefore, the pet within the pet storage module 202 can look outside the closet 104 through the door 206.

The pet storage module 202 optionally includes a pair of rails 602 mounted along outer surfaces 604 of the module side walls 226D, 226E. The rails 602 extend longitudinally along the pet storage module 202 between the front and rear ends 220, 222. The closet 104 includes guide tracks 606 mounted to the closet walls 112. For example, the compartment 114 that receives the illustrated pet storage module 202 includes one guide track 606 mounted to the side frame wall 116D and another guide track 606 mounted to the surface of the vertical partition wall 118A that faces the side frame wall 116D. The guide tracks 606 extend longitudinally from the front end 106 of the closet 104 towards the rear end 108. Each guide track 606 defines a groove 608 configured to receive one of the rails 602. As the pet storage module 202 is loaded into the compartment 114, the rails 602 engage and slide along the corresponding guide tracks 606. The guide tracks 606 guide the pet storage module 202 by controlling the lateral and vertical positions and tilt of the pet storage module 202 within the compartment 114. The guide tracks 606 guide the pet storage module 202 into alignment with the compartment 114 such that each of the latch members 208 on the pet storage module 202 align with a corresponding one of the latch members 120 mounted within the closet 104.

Optionally, the engagement between the rails 602 and the guide tracks 606 may support the weight of the pet storage module 202 with the pet therein. Thus, the pet storage module 202 in the compartment 114 may be suspended above the shelf 118B below without engaging the shelf 118B. Optionally, the shelf 118B engages and supports at least some of the weight of the pet storage module 202, such that the pet storage module 202 slides along a top surface of the shelf 118B when loading and unloading the pet storage module 202.

Figure 10:
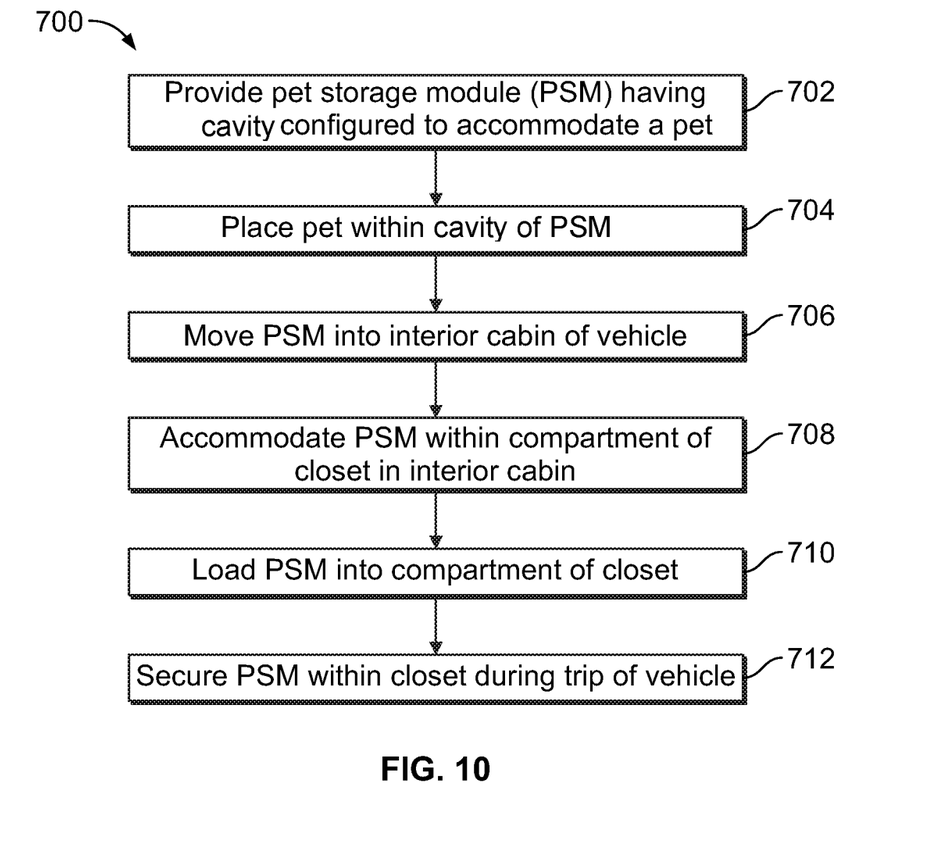
FIG. 10 is a flow chart of a method of transporting pets within an interior cabin of a vehicle, according to an embodiment of the present disclosure.

FIG. 10 is a flow chart of a method 700 of transporting pets within an interior cabin of a vehicle, according to an embodiment of the present disclosure. Referring to FIGS. 3-10, the method 700 begins at 702, at which a pet storage module 202 is provided. The pet storage module 202 includes a cavity 228 configured to accommodate a pet therein, such as a dog, a cat, a bird, a reptile, or the like. The pet storage module 202 includes multiple module walls 226 and a door 206 that enclose the cavity 228. The pet storage module 202 includes one or more latch members 208 attached to one or more of the module walls 226.

At 704, a pet is placed within the cavity 228 of the pet storage module 202. The pet is placed in the cavity 228 by opening the door 206, and the door 206 is closed after inserting the pet to contain the pet in the cavity 228. Optionally, the pet may be loaded into the pet storage module 202 outside of the vehicle 10, such as in an airport or a jet bridge (or gangway).

At 706, the pet storage module 202 is moved into an interior cabin 102 of the vehicle 10. The pet storage module 202 may be carried or wheeled into the cabin 102 along an aisle of the cabin 102. The pet storage module 202 is moved to a configurable closet 104 in the interior cabin 102 that is used to provide a pet suite. The interior cabin 102 also includes passenger seats 122, and passengers may be proximate to the closet 104. The closet 104 has closet walls including fixed frame walls 116 and configurable partition walls 118. The frame walls 116 define a perimeter of the closet 104. The partition walls 118 extend between the frame walls 116 and can be re-positioned and/or removed from the closet 104 to provide more space.

At 708, the pet storage module 202 is accommodated within a compartment 114 of the closet 104. The accommodation may be made by re-configuring the closet walls that define compartments 114. For example, if an existing compartment 114 of the closet 104 is too small to accommodate the pet storage module 202, one or more of the partition walls 118 may be selectively positioned and/or removed (relative to the frame walls 116) in order to define a compartment 114 large enough to receive the pet storage module 202 therein. Thus, the pet storage module 202 may be accommodated by selectively positioning the partition walls 118.

The accommodation step 708 may occur before, after, or concurrently with one or more of the steps 702, 704, and 706.

At 710, the pet storage module 202 is loaded into the corresponding compartment 114 of the closet 104 within the interior cabin 102. The loading includes positioning the pet storage module 202 within the compartment 114. The pet storage module 202 may be positioned to align with various features on the closet walls of the closet 104, such as latching members, rails, guide tracks, shelves, or the like. Optionally, the pet is placed into the cavity 228 at 704 prior to loading the pet storage module 202 into the closet 104.

At 712, the pet storage module 202 is secured within the closet 104 during a trip of the vehicle 10. The pet storage module 202 may be secured in the compartment 114 via one or more latching mechanisms. For example, the closet 104 includes one or more latch members 120 attached to one or more of the closet walls (e.g., the frame walls 116 and the partition walls 118). The latch members 120 are complementary with the latch members 208 on the pet storage module 202. The pet storage module 202 may be secured in the compartment 114 by releasably connecting the latch members 208 of the pet storage module 202 to the latch members 120 in the closet 104. For example, as the pet storage module 202 is received in the compartment 114, each latch member 208 aligns with and engages a corresponding latch member 120 to secure the pet storage module 202 within the closet 104 during the trip of the vehicle 10, preventing the pet storage module 202 from falling out of the closet 104.

Optionally, the closet 104 may have enough space to accommodate multiple pet storage modules 202. Therefore, the method 700 may repeat for storing additional pets within the pet suite. For example, after the first pet storage module 202 is loaded into the compartment 114, the remaining partition walls 118 of the closet 104 may be reconfigured to provide a second compartment large enough to receive a second pet storage module 202 in a different, spaced-apart area of the closet 104. The second pet storage module 202 may be subsequently loaded into that compartment and secured in place.

Optionally, the method 700 may also include providing amenities to the pet within the pet storage module 202 during the trip, such as by filling a bowl or a drink dispenser with food or water. The method 700 may also include acquiring image data of the pet within the pet storage module 202 via a camera 254 mounted to the pet storage module 202. The image data acquired by the camera 254 may be displayed on a display device 306 visible to a passenger on the vehicle 10. Optionally, additional sensors and/or devices may be installed on or within the pet storage module 202, such as a temperature sensor for monitoring the temperature within the module 202, a sensor for monitoring a quantity of water or food available to the pet within the module 202, or the like.

As described herein, embodiments of the present disclosure provide systems and methods of transporting pets onboard a vehicle, such as but not limited to a commercial aircraft. The systems and methods are configured to allow pets to travel within a passenger cabin of the vehicle without being stowed underneath passenger seats and without disturbing other passengers. The systems and method are also configured to provide the pets various amenities to prevent stress and anxiety of the pets during the trip. Embodiments of the present disclosure provide systems and methods that occupy an existing closet on the vehicle without requiring removal of passenger seats or other renovations to the cabin of the vehicle.

While various spatial and directional terms, such as top, bottom, front, rear, lateral, horizontal, vertical, and the like, may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, the term "controller," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A pet travel system comprising:
a pet storage module having multiple module walls and a door that enclose a cavity configured to receive a pet, the pet storage module including one or more first latch members attached to one or more of the module walls; and
a closet within an interior cabin of a vehicle, the closet extending a depth from a front end of the closet to an opposite rear end of the closet, the closet including closet walls defining a compartment sized to receive the pet storage module therein, the closet further including one or more second latch members attached to one or more of the closet walls,
wherein a first latch member of the one or more first latch members is positioned relative to a second latch member of the one or more second latch members such that the first latch member releasably connects to the second latch member as the pet storage module is loaded into the compartment through the front end and moves towards the rear end to secure the pet storage module within the closet during a trip of the vehicle, and
wherein the first latch member of the pet storage module defines a push-push latch assembly with the second latch member such that additional movement of the pet storage module towards the rear end of the closet while the first latch member is connected to the second latch member causes the first latch member to release from the second latch member and allow the pet storage module to be removed through the front end of the closet.

2. The pet travel system of claim 1, wherein the module walls of the pet storage module include a rear wall opposite the door, a bottom wall extending between the rear wall and the door, and one or more side walls extending between the rear wall and the door, the one or more side walls at least partially covered by a sound-absorbing padding.

3. The pet travel system of claim 1, wherein the module walls of the pet storage module include a rear wall opposite the door and a bottom wall extending between the rear wall and the door, the pet storage module including a cushion within the cavity along the bottom wall, the cushion having a moisture-absorbing layer.

4. The pet travel system of claim 1, wherein the door of the pet storage module is see-through and composed of a polymer or a glass, the door defining air holes therethrough for ventilation.

5. The pet travel system of claim 1, wherein the door of the pet storage module has an inner surface and an opposite outer surface and defines an opening therethrough between the inner and outer surfaces, the pet storage module including an electric fan mounted through the opening in the door to ventilate the cavity of the pet storage module.

6. The pet travel system of claim 1, wherein the door of the pet storage module has an inner surface and an opposite outer surface and defines a window therethrough between the inner and outer surfaces, the door including a panel movable relative to the door between a closed position and an open position, the panel configured to cover the window in the closed position and expose the window in the open position to allow access to the pet without opening the door.

7. The pet travel system of claim 1, wherein the pet storage module includes a water dispenser mounted to an inner surface of one of the module walls or the door within the cavity.

8. The pet travel system of claim 1, wherein the pet storage module further includes a camera mounted to one of the module walls or the door, the camera positioned to acquire image data of the pet within the cavity, the camera operably connected to a communication device configured to communicate the image data of the pet acquired by the camera to a display device visible to a passenger on the vehicle.

9. The pet travel system of claim 1, wherein the closet walls include fixed frame walls and configurable partition walls, the frame walls defining a perimeter of the closet, the partition walls removably mounted between the frame walls to selectively configure a size of the compartment that receives the pet storage module and a location of the compartment within the closet.

10. The pet travel system of claim 1, wherein the first latch member includes a base and an arm extending outward from the base, the second latch member including a keeper housing that defines a receptacle configured to receive and hold the arm of the first latch member therein as the pet storage module is loaded towards the rear end of the closet.

11. The pet travel system of claim 1, wherein the first latch member includes a keeper housing that defines a receptacle, the second latch member including a base and an arm extending outward from the base, the arm of the second latch member configured to be received and held within the receptacle of the first latch member as the pet storage module is loaded towards the rear end of the closet.

12. The pet travel system of claim 1, wherein each of two of the closet walls defining opposing sides of the compartment includes a respective guide track mounted thereto that extends from the front end towards the rear end, and the pet storage module includes rails configured to engage and slide along the guide tracks as the pet storage module is loaded into the compartment.

13. The pet travel system of claim 1, wherein the pet storage module is oriented within the compartment such that the door of the pet storage module is disposed proximate to the front end of the closet and a rear wall of the pet storage module that is opposite the door is disposed proximate to the rear end of the closet.

14. The pet travel system of claim 1, wherein the vehicle is an aircraft, and the interior cabin also includes multiple passenger seats.

15. A method for traveling with pets comprising:
providing a pet storage module that is configured to accommodate a pet, the pet storage module including multiple module walls and a door that enclose a cavity, the pet storage module including one or more first latch members attached to one or more of the module walls;
loading the pet storage module into a closet of an interior cabin of a vehicle, the closet extending a depth from a front end of the closet to an opposite rear end of the closet, wherein the loading comprises pushing the pet storage module into a compartment of the closet through the front end towards the rear end, the compartment defined by closet walls;
releasably connecting a first latch member of the one or more first latch members of the pet storage module to a second latch member of one or more second latch members of the closet within the compartment as the pet storage module is loaded into the compartment and moves towards the rear end to secure the pet storage module within the closet during a trip of the vehicle; and releasing the first latch member of the pet storage module from the second latch member of the closet by pushing the pet storage module towards the rear end of the closet while the first and second latch members are connected such that additional movement of the pet storage module towards the rear end of the closet causes the first latch member to release from the second latch member and enable the pet storage module to be unloaded from the compartment through the front end of the closet.

16. The method of claim 15, further comprising placing a pet within the cavity of the pet storage module before the loading.

17. The method of claim 16, wherein the placing comprises placing the pet within the cavity of the pet storage module outside of the vehicle, the method further including moving the pet storage module with the pet therein into the interior cabin of the vehicle.

18. The method of claim 15, wherein the pet storage module is a first pet storage module and the compartment of the closet that receives the first pet storage module is a first compartment, the method further including loading a second pet storage module into the closet within a second compartment that is spaced apart from the first compartment.

19. The method of claim 15, further comprising:
acquiring image data of the pet within the pet storage module via a camera mounted to one or more of the module walls or the door; and
displaying the image data acquired by the camera on a display device visible to a passenger on the vehicle.

20. A pet travel system comprising:
a pet storage module having a front end and a rear end, the pet storage module including a housing that is open at the front end, the pet storage module including a door at the front end, the door and the housing enclosing a cavity configured to receive a pet through the door, the pet storage module including a first latch member mounted to the housing along an exterior surface of the housing and two rails mounted to the housing along the exterior surface, the first latch member located at least proximate to the rear end, wherein the pet storage module is configured to be loaded rear-end-first in a loading direction into a closet within an interior cabin of a vehicle towards a back wall of the closet, the two rails configured to engage and slide along two guide tracks mounted to two closet walls of the closet as the pet storage module is moved in the loading direction into a compartment defined between the two closet walls, wherein the first latch member is configured to releasably connect to a complementary mating latch member within the closet as the pet storage module is moved in the loading direction to secure the pet storage module in the closet during a trip of the vehicle, the first latch member of the pet storage module defines a push-push latch assembly with the mating latch member such that additional movement of the pet storage module in the loading direction relative to the closet while the first latch member is connected to the mating latch member causes the first latch member to release from the mating latch member and allow the pet storage module to be removed from the closet.

21. The pet travel system of claim 20, wherein the housing of the pet storage module includes a rear wall opposite the door and multiple side walls extending from the rear wall to the door, the side walls at least partially covered by a sound-absorbing padding.

22. The pet travel system of claim 20, wherein the door of the pet storage module is see-through and composed of a polymer or a glass, the door defining air holes therethrough for ventilation.

* * * * *